United States Patent
Moriya et al.

(10) Patent No.: US 11,674,790 B2
(45) Date of Patent: *Jun. 13, 2023

(54) METHOD OF INSTALLING STROKE SENSOR

(71) Applicant: TDK Corporation, Tokyo (JP)

(72) Inventors: Takahiro Moriya, Tokyo (JP); Toshio Ishikawara, Tokyo (JP); Toshihiko Oyama, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/704,430

(22) Filed: Mar. 25, 2022

(65) Prior Publication Data
US 2022/0214154 A1 Jul. 7, 2022

Related U.S. Application Data

(63) Continuation of application No. 17/153,372, filed on Jan. 20, 2021, now Pat. No. 11,320,252.

(30) Foreign Application Priority Data

Feb. 6, 2020 (JP) .............................. JP2020-018512

(51) Int. Cl.
*G01B 7/00* (2006.01)
(52) U.S. Cl.
CPC .................... *G01B 7/003* (2013.01)
(58) Field of Classification Search
CPC ...... G01D 18/00; G01D 5/145; G01D 5/2046; G01D 5/147; G01B 7/003; F15B 15/2815
See application file for complete search history.

(56) References Cited

U.S. PATENT DOCUMENTS

| 11,320,252 B2* | 5/2022 | Moriya | G01D 5/145 |
| 2005/0232094 A1* | 10/2005 | Hoshino | G01D 5/145 369/44.11 |

(Continued)

FOREIGN PATENT DOCUMENTS

| JP | 2005-017220 A | 1/2005 |
| JP | 2009-44888 A | 2/2009 |

(Continued)

*Primary Examiner* — Jermele M Hollington
*Assistant Examiner* — Suresh K Rajaputra
(74) *Attorney, Agent, or Firm* — Posz Law Group, PLC

(57) ABSTRACT

A method of installing a stroke sensor that enables the stroke sensor to be adjusted in a simple process is provided. The method has the steps of: arranging a second magnet, relative to the magnetic field detecting element, at a physically determinable first reference position and obtaining an indicator value S1; attaching the first magnet and the magnetic field detecting element to structures different from each other, respectively, and positioning the first magnet, relative to the magnetic field detecting element, at a physically determinable second reference position, and obtaining an indicator value S2, wherein the second reference position corresponds to the first reference position; calculating $\Delta S = S1-S2$, wherein $\Delta S$ is a difference between the indicator value S1 and the indicator value S2; and modifying a process in the processor such that a sum of the indicator value S and $\Delta S$ is outputted.

10 Claims, 6 Drawing Sheets

(56) References Cited

U.S. PATENT DOCUMENTS

| | | | | |
|---|---|---|---|---|
| 2010/0188074 A1* | 7/2010 | Matsumoto | ............ | G01D 5/145 |
| | | | | 324/207.2 |
| 2011/0248705 A1* | 10/2011 | Matsumoto | ............ | G01D 5/145 |
| | | | | 324/207.2 |
| 2021/0262829 A1* | 8/2021 | Moriya | ................ | G01D 5/2013 |

FOREIGN PATENT DOCUMENTS

| | | |
|---|---|---|
| JP | 2009-174863 A | 8/2009 |
| JP | 2010-025879 A | 2/2010 |

* cited by examiner

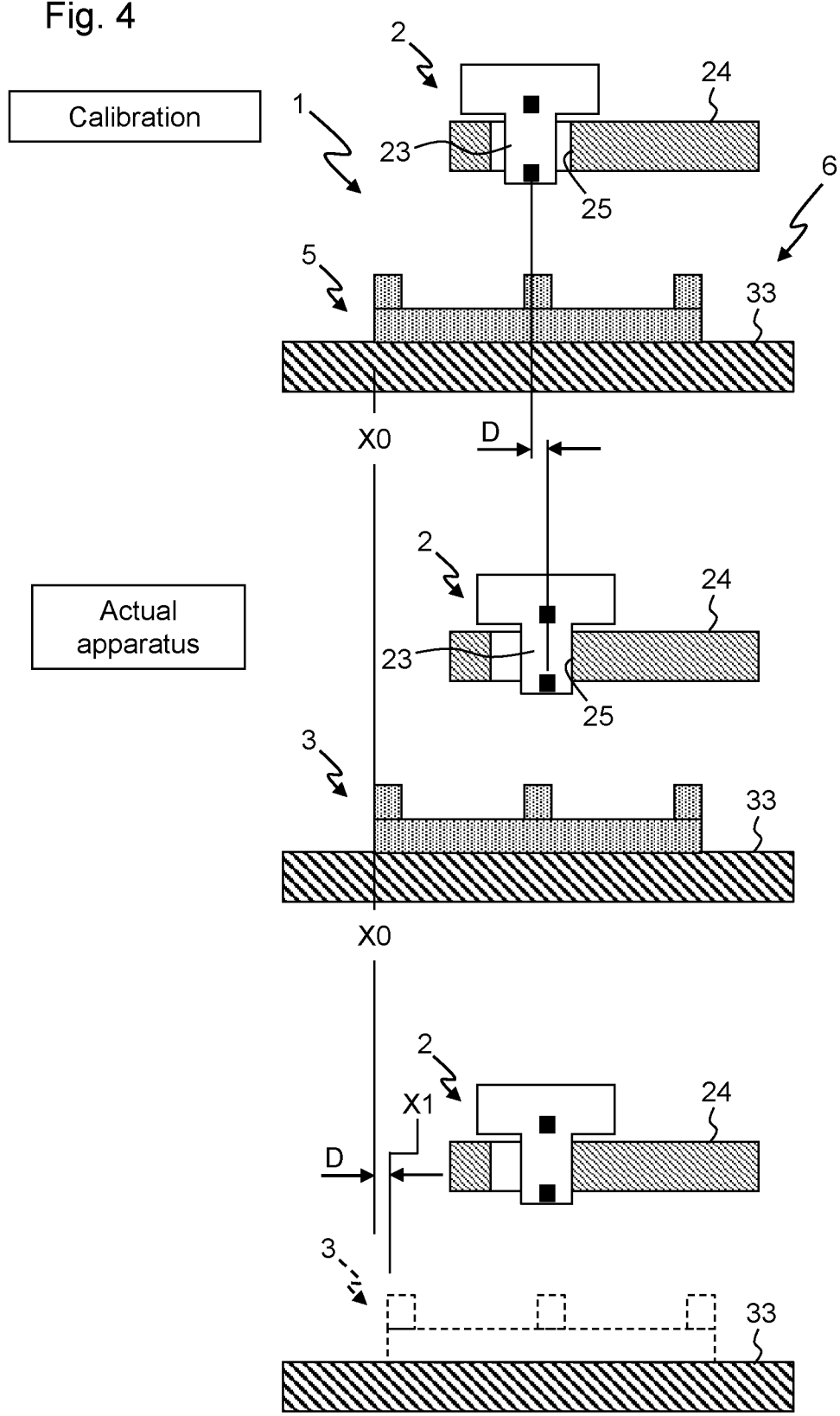

METHOD OF INSTALLING STROKE SENSOR

CROSS REFERENCE TO RELATED APPLICATIONS

The present application is a continuation application of U.S. application Ser. No. 17/153,372, filed on Jan. 20, 2021, which is based on, and claims priority from, Japanese application No. 2020-018512, filed on Feb. 6, 2020, the disclosures of which are hereby incorporated by reference.

BACKGROUND OF THE INVENTION

1. Field of the Invention

The present invention relates to a method of installing a stroke sensor.

2. Description of the Related Art

A stroke sensor is used in various kinds of fields, such as a transmission and a brake of a vehicle. JP2009-44888 discloses an actuator having a sensor for detecting a rotational angle. The sensor is pre-installed in the actuator. In order to compensate the error in installing the actuator, the moving distance of the drive shaft of the actuator and the sensor output are measured by operating the actuator, and the sensor characteristics that are stored in the sensor are rewritten accordingly.

SUMMARY OF THE INVENTION

In the method of rewriting the sensor characteristics disclosed in JP2009-44888, it is necessary to move the actuator after the sensor is installed in the actuator. As a result, the processes are complicated after the sensor is installed in the actuator.

The present invention aims at providing a method of installing a stroke sensor that enables the stroke sensor to be adjusted in a simple process.

According to the present invention, a method of installing a stroke sensor is provided, wherein the stroke sensor includes a magnetic field detecting element that detects a magnetic field, a first magnet that generates the magnetic field and that is movable in a first direction relative to the magnetic field detecting element, and a processor that calculates an indicator value S based on the magnetic field that is detected by the magnetic field detecting element, wherein the indicator value S indicates a relative position of the first magnet relative to the magnetic field detecting element. The method comprises the steps of: arranging a second magnet, relative to the magnetic field detecting element, at a physically determinable first reference position and obtaining an indicator value S1; attaching the first magnet and the magnetic field detecting element to structures different from each other, respectively, and positioning the first magnet, relative to the magnetic field detecting element, at a physically determinable second reference position, and obtaining an indicator value S2, wherein the second reference position corresponds to the first reference position; calculating $\Delta S = S1 - S2$, wherein $\Delta S$ is a difference between the indicator value S1 and the indicator value S2; and modifying a process in the processor such that a sum of the indicator value S and $\Delta S$ is outputted.

According to the present invention, it is possible to provide a method of installing a stroke sensor that enables the stroke sensor to be adjusted in a simple process.

The above and other objects, features and advantages of the present invention will become apparent from the following description with reference to the accompanying drawings which illustrate examples of the present invention.

BRIEF DESCRIPTION OF THE DRAWINGS

FIG. 4 is a view illustrating the influence of the positional deviation on the measurement accuracy;

DETAILED DESCRIPTION OF THE INVENTION

With reference to the drawings, a method of installing stroke sensor 1 according to an embodiment of the present invention will be described. In the following descriptions, the direction in which the first magnet is moved is referred to as a first direction or the X direction. The direction that is perpendicular to the X direction and that is perpendicular to the surface of first magnet 3 that faces magnetic field detecting element 21 is referred to as the Y direction. The term "relative position" or "relative position of first magnet 3" refers to the position of first magnet 3 in the X direction relative to magnetic field detecting element 21 unless otherwise defined.

Figure 1:
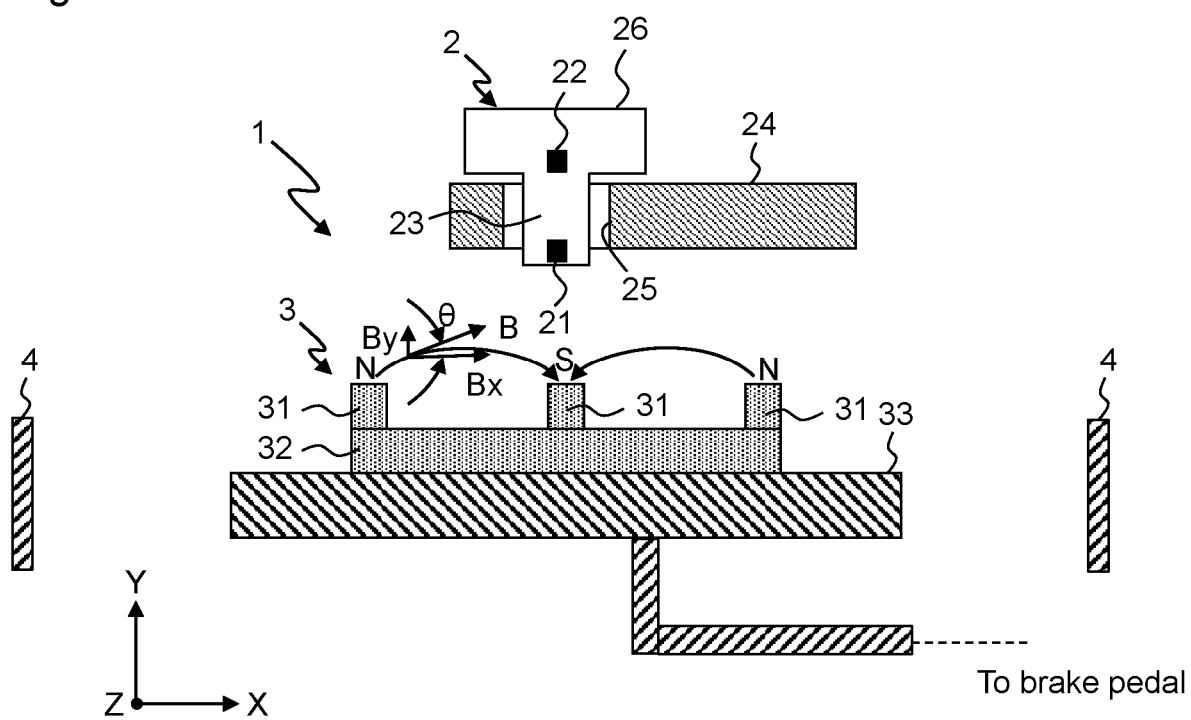
FIG. 1 is a schematic view showing the arrangement of a stroke sensor according to an embodiment of the present invention.

FIG. 1 shows a schematic view of stroke sensor 1 that is installed on a vehicle or the like. Stroke sensor 1 has sensor assembly 2 that includes magnetic field detecting element 21 that detects a magnetic field and processor 22, as well as first magnet 3 that generates a magnetic field that is detected by magnetic field detecting element 21. First magnet 3 includes three sub-magnets 31 that are aligned in the X direction at the same interval and yoke 32 that connects sub-magnets 31 to each other. The N pole and the S pole are alternately arranged on the surfaces of three sub-magnets 31 that face magnetic field detecting element 21. First magnet 3 is supported by first structure 33, such as a support plate, and first structure 33 is connected to a movable element, such as a brake pedal (not illustrated). First magnet 3 is movable in the X direction relative to sensor assembly 2, that is, magnetic field detecting element 21. By detecting the position of first magnet 3 relative to magnetic field detecting element 21, it is possible to detect, for example, the amount of depression of a brake pedal. A pair of stoppers 4 is provided on both sides of first structure 33, and first structure 33 is movable between both stoppers 4. In other words, the movable range of first structure 33 is the range between both stoppers 4, and the movable range of first magnet 3 is determined accordingly.

Sensor assembly 2 is attached to second structure 24 that is different from first structure 33. Second structure 24 is, for example, a cover element that covers first structure 33 and, second structure 24 is movable in the X direction relative to first structure 33. In order to arrange magnetic field detecting element 21 near first magnet 3, protrusion 23, that has magnetic field detecting element 21 formed at the tip end thereof, is inserted into hole 25 that is provided in second structure 24. Sensor assembly 2 has housing 26 that covers magnetic field detecting element 21 and processor 2. If second structure 24 has a space for magnetic field detecting element 21 and processor 22, then housing 26 may be omitted. Magnetic field detecting element 21 includes an element that detects a magnetic field in the X direction and an element that detects a magnetic field in the Y direction (both not illustrated). The type of these elements is not limited, and a Hall element, a TMR element, a GMR element and so on may be used. Sensor assembly 2 is preferably immovable because a power cable, an output cable and the like are connected to sensor assembly 2. Accordingly, sensor assembly 2 is immovable, and first magnet 3 is movable in the present embodiment. However, sensor assembly 2 may be movable, and first magnet 3 may be immovable.

Processor 22 calculates indicator value S that indicates the relative position of first magnet 3 based on the magnetic field that is detected by magnetic field detecting element 21. Three sub-magnets 31 generate a magnetic flux having a substantially sinusoidal shape across them. Assume that the X component and the Y component of a magnetic flux at a certain position is Bx and By, respectively. Then, angle θ of the magnetic flux relative to the X direction at the position (hereinafter, referred to as angle θ of the magnetic field) can be expressed by arctan (By/Bx). The magnetic field around first magnet 3 can be obtained by analysis etc. in advance. Since the gap between magnetic field detecting element 21 and first magnet 3 in the Y direction is known, if angle θ of the magnetic field is obtained, then the relative position of first magnet 3 can be calculated. Processor 22 calculates angle θ of the magnetic field=arctan (By/Bx) from Bx and By that are detected by magnetic field detecting element 21, converts angle θ of the magnetic field to output voltage V that corresponds to the relative position, and outputs output voltage V. Angle θ of the magnetic field can be detected over the angle range of 0 to 360°. Therefore, indicator value S is output voltage V that is determined based on angle θ of the magnetic field.

Figure 2A:
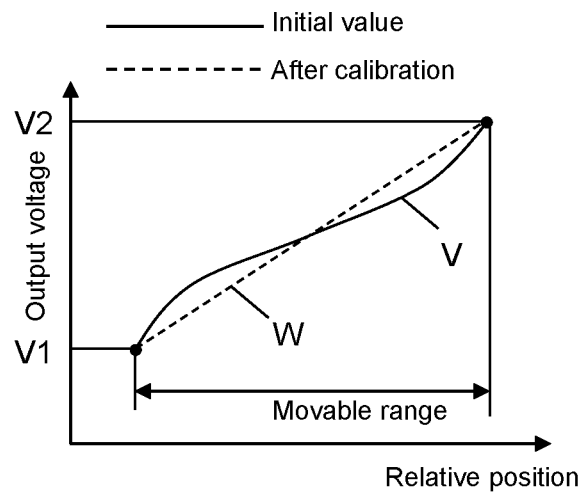
FIGS. 2A to 2C are conceptual views showing the relationship between the displacement of the stroke sensor and the output voltage.

The relationship between the relative position and output voltage V is typically curvilinear and can be expressed by a curved line that resembles a cubic function, as shown by the solid line in FIG. 2A. Accordingly, before stroke sensor 1 is installed in an actual apparatus, calibration to convert the relationship between the relative position and output voltage V (the initial indicator value) to a linear relationship is performed for each stroke sensor 1. The method of the calibration will be now described.

Figure 5A:
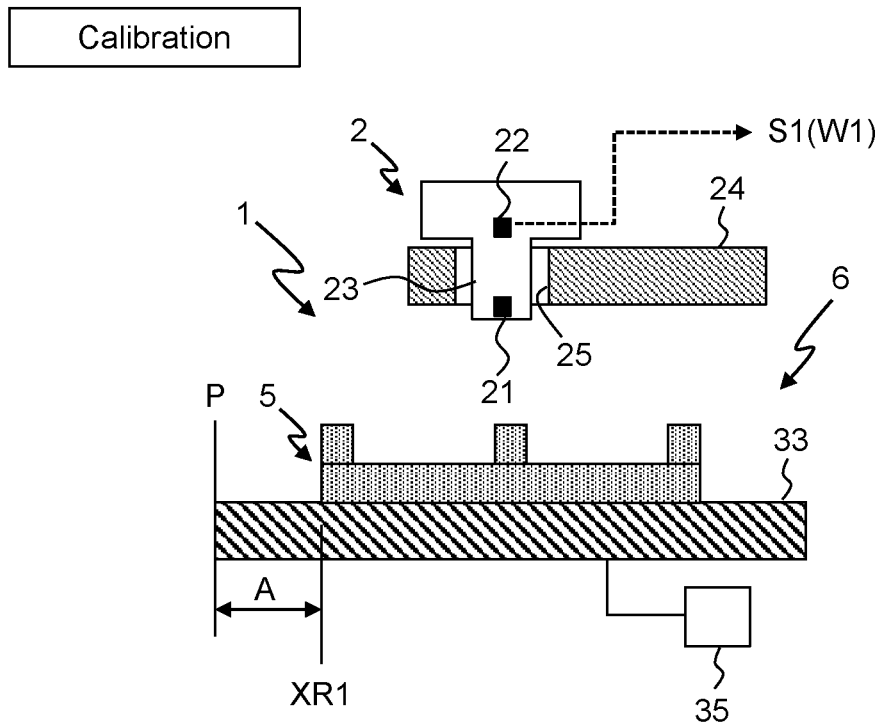
FIGS. 5A to 5B are views showing a method of adjusting a stroke sensor.
Figure 5B:
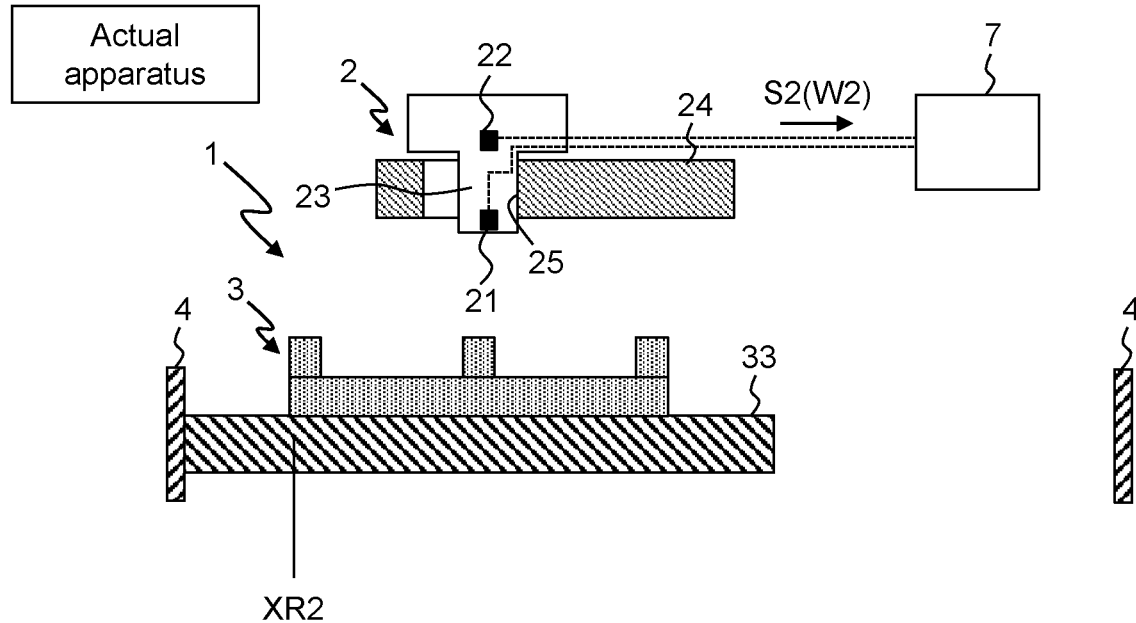

First, sensor assembly 2 is attached to calibration apparatus 6 (see FIGS. 4, 5A, 5B). Master magnet 5 (a second magnet) that is different from first magnet 3 is attached to calibration apparatus 6. Calibration apparatus 6 simulates first structure 33 to which first magnet 3 is attached and second structure 24 to which sensor assembly 2 is attached. Master magnet 5 has the same magnetic properties and shape as first magnet 3. Therefore, calibration apparatus 6 has substantially the same configuration as the actual apparatus that is shown in FIG. 1 except for error factors, such as manufacturing errors. The movable range of master magnet 5 of calibration apparatus 6 is set to be wider than the movable range of first magnet 3 of an actual apparatus. Use of such calibration apparatus 6 enables many sensor assemblies 2 to be efficiently calibrated. Further, since sensor assembly 2 can be combined with any first magnet 3 that is substantially the same as master magnet 5, the management of first magnet 3 can be easily performed. Calibration apparatus 6 calculates angle θ of the magnetic field=arctan (By/Bx) while moving master magnet 5 relative to sensor assembly 2 over the entire movable range in the X direction, converts angle θ of the magnetic field to output voltage V that corresponds to the relative position, and outputs output voltage V. Since master magnet 5 and first magnet 3 are substantially the same, the relationship between the relative position and output voltage V is expressed by a curved line that is substantially the same as the solid line in FIG. 2A.

Figure 3:
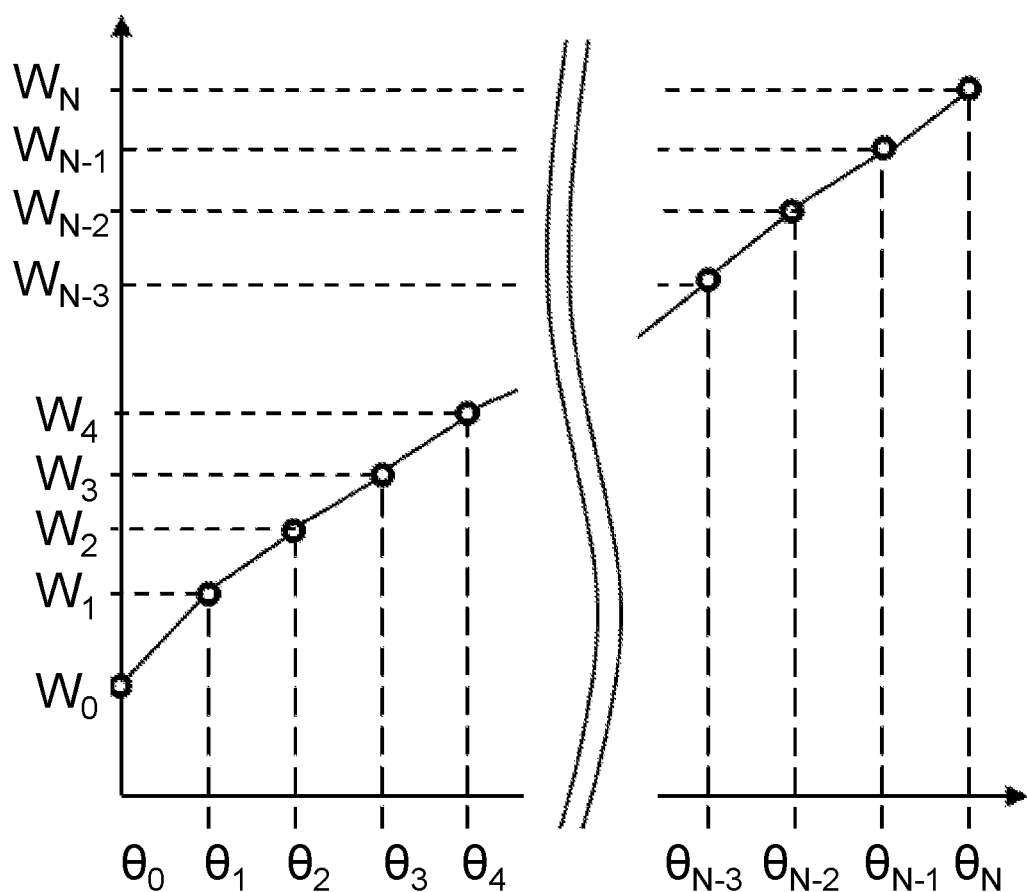
FIG. 3 is an example of a conversion formula used for the calibration of a stroke sensor.

Next, a line that connects output voltages V1 and V2 at both ends of the movable range is calculated. The line is regarded as the relationship formula between the relative position and output voltage V that has been calibrated (hereinafter, referred to as output voltage W). The relationship formula between the relative position and output voltage W is a linear function. In order to obtain the relationship formula, processor 22 has converting means that converts angle θ of the magnetic field to output voltage W. The converting means are generated as a conversion map shown in FIG. 3. For convenience, the converting means are shown by a graph in FIG. 3, but the converting means are actually stored as a table in the memory of processor 22. Conversion map is generated as a set of $\theta_0, \theta_1, \theta_2, \ldots, \theta_{N-2}, \theta_{N-1}, \theta_N$ versus output voltage $W_0, W_1, W_2, \ldots, W_{N-2}, W_{N-1}, W_N$ (where $\Delta\theta = \theta_i - \theta_{i-1} = 360°/N$) (N is a natural number). N is selected, for example, from the range between 30 and 40. In the present embodiment, the converting means convert angle θ of the magnetic field to output voltage W, but output voltage V may be converted to output voltage W.

Stroke sensor 1 works in the following manner. Magnetic field detecting element 21 of sensor assembly 2 detects Bx and By. Processor 22 calculates angle θ of the magnetic field=arctan (By/Bx). Processor 22 converts angle θ of the magnetic field to output voltage W, that corresponds to the relative position, by means of the converting means, and outputs output voltage W. Angle θ of the magnetic field is calculated from the conversion map by interpolation, as needed. In this manner, stroke sensor 1 outputs output voltage W that is in a linear relationship with the relative position.

However, there is a possibility that when first magnet 3 is attached to first structure 33 and sensor assembly 2 that has been calibrated is attached to second structure 24, the relationship between the relative position and output voltage W, that is, the relationship shown by the dashed line in FIG. 2A is not maintained. For example, due to the manufacturing tolerance that both first structure 33 and second structure 24 have, the positions of first magnet 3 and sensor assembly 2 may be relatively shifted in the X direction. The position of hole 25 of second structure 24 may also be shifted in the X direction. The positional shift may also occur when first magnet 3 is attached to first structure 33 or when sensor assembly 2 is attached to second structure 24. For example, due to a gap that is present between protrusion 23 of sensor assembly 2 and hole 25 of second structure 24, it is difficult to precisely control the position where sensor assembly 2 is attached to second structure 24. The positions of sensor assembly 2 and first magnet 3 may also be shifted when these are attached by an adhesive and the like.

Figure 2B:
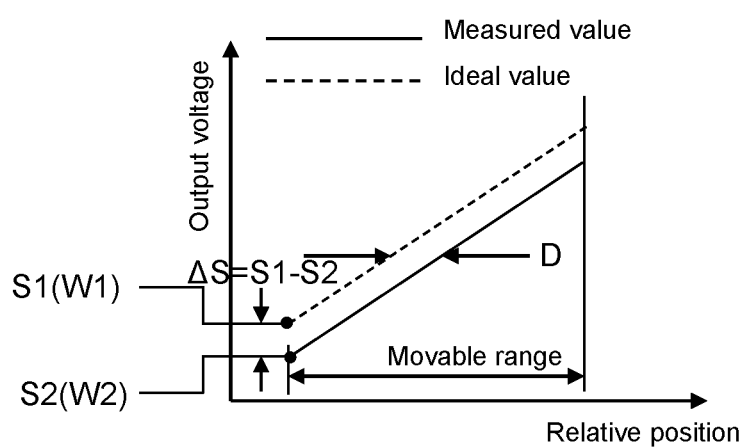

FIG. 4 conceptually illustrates the influence of the positional shift on the measurement accuracy. As shown in the upper part in FIG. 4, assume that the calibration has been performed when protrusion 23 of sensor assembly 2 was attached, with protrusion 23 being concentric with hole 25. On the other hand, in an actual apparatus shown in the middle part in FIG. 4, protrusion 23 of sensor assembly 2 was attached, with protrusion 23 being in contact with the right edge of hole 25. First magnet 3 is attached at the same position as master magnet 5. In other words, the position of sensor assembly 2 relative to first magnet 3 and the position of sensor assembly 2 relative to master magnet 5 are shifted by distance D. In this case, sensor assembly 2 that has been installed in the actual apparatus recognizes that first magnet 3 at the position in the middle part in FIG. 4 is positioned as shown by the dashed line in the bottom part in FIG. 4. That is, sensor assembly 2 recognizes that first magnet 3 is shifted rightward from the actual position by distance D. In other words, when the end of first magnet 3 is at position X1 that is shifted rightward from position X0 by distance D, sensor assembly 2 outputs output voltage W that is to be outputted when the end of first magnet 3 is at position X0. As a result, the output line is translated by distance D, as shown in FIG. 2B, and the measurement accuracy of stroke sensor 1 worsens. It should be noted that the position of sensor assembly 2 relative to first magnet 3 and the position of sensor assembly 2 relative to master magnet 5 may be shifted from each other in the Z direction (the direction perpendicular to both the X direction and the Y direction in FIG. 1). However, the Z direction is not a direction in which stroke sensor 1 detect a position, and the distribution of the magnetic field does not largely vary in the Z direction. Therefore, the positional shift in the Z direction does not largely affect the measurement accuracy. The measurement error in the Z direction is smaller, on the level of one digit, than the measurement error that is caused by the positional shift on the same level as in the X direction. The measurement error when the position of sensor assembly 2 relative to first magnet 3 and the position of sensor assembly 2 relative to master magnet 5 are shifted from each other in the Y direction is about the same level as the measurement error that is caused by the positional shift in the Z direction.

Accordingly, the process that is carried out in processor 22 of stroke sensor 1 is modified in the present embodiment. First, as shown in FIG. 5A, the left end of master magnet 5 is arranged at first reference position XR1 in calibration apparatus 6. XR1 is a physically determinable relative position. "Physically determinable" means that the position of master magnet 5 in the X direction relative to magnetic field detecting element 21 can be determined by any physical means, such as mechanical means, electric means and magnetic means. In the present embodiment, the movable range of first structure 33 is delimited by motor 35 that drives first structure 33. Therefore, the left end of the movable range of first structure 33 that is determined by the control of motor 35 is a position that can be determined by electric means. Examples of a position that is determined by mechanical means include a position of a stopper that is provided in calibration apparatus 6 and that simulates stopper 4 of an actual apparatus, a position where a spring is compressed to its maximum and so on. In the embodiment, first reference position XR1 is arranged in the movable range of first structure 33 and is spaced distance A rightward from left end position P that is delimited by motor 35. Position P is the position of left stopper 4 of an actual apparatus, and the position of left stopper 4 is simulated by motor 35. Since master magnet 5 is precisely attached to first structure 33 at a predetermined position thereof, distance A is highly accurate. Next, processor 22 calculates indicator value S1 that indicates first reference position XR1 and outputs output voltage W1 that corresponds to indicator value S1. Indicator value S1 is outputted to adjustment apparatus 7 or a to storage apparatus for the later process. These operations are performed as a part of the calibration mentioned above. Since indicator value S1 that indicates first reference position XR1 is obtained in the calibration, no additional operation is required to obtain indicator value S1.

Next, as shown in FIG. 5B, first magnet 3 is attached to first structure 33, and sensor assembly 2 is attached to second structure 24. In FIG. 5B, in the same manner as shown in FIG. 4, sensor assembly 2 is attached to second structure 24, with protrusion 23 being in contact with the right edge of hole 25. However, it is not necessary that the position of sensor assembly 2 relative to hole 25 is known. In the following process, adjustment apparatus 7 is used to modify the process of processor 22 of stroke sensor 1. First magnet 3 is arranged at second reference position XR2, which is a relative position that corresponds to first reference position XR1 and that is physically determinable. The term "corresponds to first reference position XR1" means that, based on the entire arrangement of first structure 3 and second structure 24, second reference position X2 in the actual apparatus corresponds to first reference position XR1 in calibration apparatus 6. In the present embodiment, second reference position XR2 is one end of the movable range of the first magnet 3, that is, the position of the left end of first magnet 3 when first structure 33 abuts against stopper 4 on the left side, and second reference position XR2 corresponds to first reference position XR1. In other words, in the present embodiment, first reference position XR1 is positioned at the end of the movable range of master magnet 5 in calibration apparatus 6 (that simulates the movable range of first magnet 3 in the actual apparatus), and second reference position XR2 is positioned at the corresponding end of the movable range of first magnet 3 in the actual apparatus.

Next, processor 22 calculates indicator value S2 that indicates second reference position XR2, and adjustment apparatus 7 reads output voltage W2, that is indicator value S2. Unlike the calibration, it is not necessary to move first magnet 3. The left end of first magnet 3 stays at second reference position XR2. Second reference position XR2 may be at any position as long as the relationship between first reference position XR1 and second reference position XR2 can be definitely determined, but preferably at the initial position where the installation is performed. By doing so, it is not necessary to further move first magnet 3 after first magnet 3 is attached.

Next, adjustment apparatus 7 calculates a difference between indicator value S1 and indicator value S2, i.e., ΔS=S1-S2. Indicator value S1 has been directly inputted to adjustment apparatus 7 or has been inputted in advance to adjustment apparatus 7 via the above-mentioned storage apparatus. As mentioned above, since the position of sensor assembly 2 in calibration apparatus 6 is shifted from that in the actual apparatus, indicator value S2 is different from indicator value S1. Accordingly, adjustment apparatus 7 modifies the flow of processor 22 such that a sum of indicator value S and ΔS is outputted. Specifically, adjustment apparatus 7 updates the program that is stored in processor 22 so as to add ΔW=W1-W2 to output voltage W that is calculated by the above-mentioned method, and to output the sum. For example, when output voltage W1 is 4.0V and output voltage W2 is 3.9V, stroke sensor 1 must output 4.0V as output voltage W2 at second reference position XR2. This is because stroke sensor 1 is adjusted so as to output 4.0V as voltage W1 at first reference position XR1 that corresponds to second reference position XR2. If output voltage W1 of 4.0V is not outputted at second reference position XR2, then the position of first magnet 3 cannot be precisely detected. Accordingly, adjustment apparatus 7 modifies the process in processor 22 so as to add ΔW=4.0-3.9=0.1V to output voltage W2 of 3.9V and to output 4.0V as output voltage W2. Alternatively, the conversion map may be directly updated by a writing apparatus such that output voltage W is increased by ΔW.

Figure 2C:
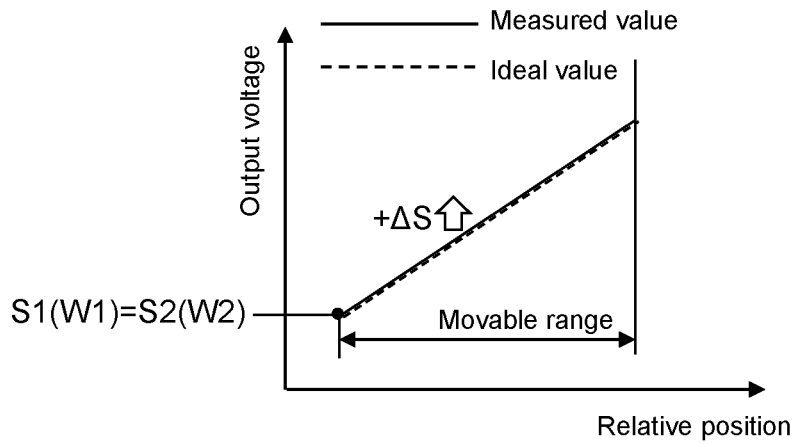

In this manner, as shown in FIG. 2C, the positional shift that occurs when the sensor is installed in an actual apparatus is cancelled, and the relationship between the relative position and output W that is obtained in the calibration is restored. This is because the positional shift is generally so small that, by applying ΔS that is obtained at a reference position to the other positions, the positional shift at the other positions can also be cancelled at about the same level. In other words, the measured value and the ideal value in FIG. 2B are substantially in the relationship of a translation. Thus, by determining the amount of the positional shift at one point and by translating the graph of the measured values by the amount, the whole measured values can be modified with the same level of accuracy.

In the present embodiment, it is not necessary to move first magnet 3 when stroke sensor 1 is adjusted in an actual apparatus. All that is required after first magnet 3 and sensor assembly 2 are installed in an actual apparatus is to obtain indicator value S2 at the initial position where first magnet 3 and sensor assembly 2 are installed, to calculate ΔS, and to modify the process in processor 22 accordingly. In general, the calibration of stroke sensor 1 is performed by the manufacturer of stroke sensor 1, but the adjustment of stroke sensor 1, after it is installed in an actual apparatus, is carried out by the manufacturer of an assembly to which stroke sensor 1 is incorporated or by the manufacturer of the final product. Accordingly, in the present embodiment, the process that is performed by the manufacturer of the assembly or by the manufacturer of the final product is simplified and the added value of stroke sensor 1 is increased.

In the present embodiment, a highly precise calibration can be performed even when first magnet 3 is movable to limited positions, that is, only discretely movable. For example, first structure 33 may be connected to an element, such as a plunger, that is configured to stop only at both ends of the movable range. When calibration of stroke sensor 1 is carried out after stroke sensor 1 is installed in an actual apparatus, the measurements that can be used for the calibration are limited to the values that are measured at the two points. In the present embodiment, since calibration using measurements at multiple points is possible before stroke sensor 1 is installed in an actual apparatus, the accuracy of the calibration can be improved.

An embodiment of the present invention has been described, but the present invention is not limited to the embodiment. For example, first magnet 3 may be used as second magnet 5 for the calibration. First magnet 3 has substantially the same magnetic properties as master magnet 5, but there is a possibility that the magnetic properties of the two magnets are not completely the same. Since first magnet 3 that is to be installed in an actual apparatus is used for the calibration instead of master magnet 5, measurement error that is caused by the difference in the magnetic properties between first magnet 3 and master magnet 5 does not occur.

Figure 6:
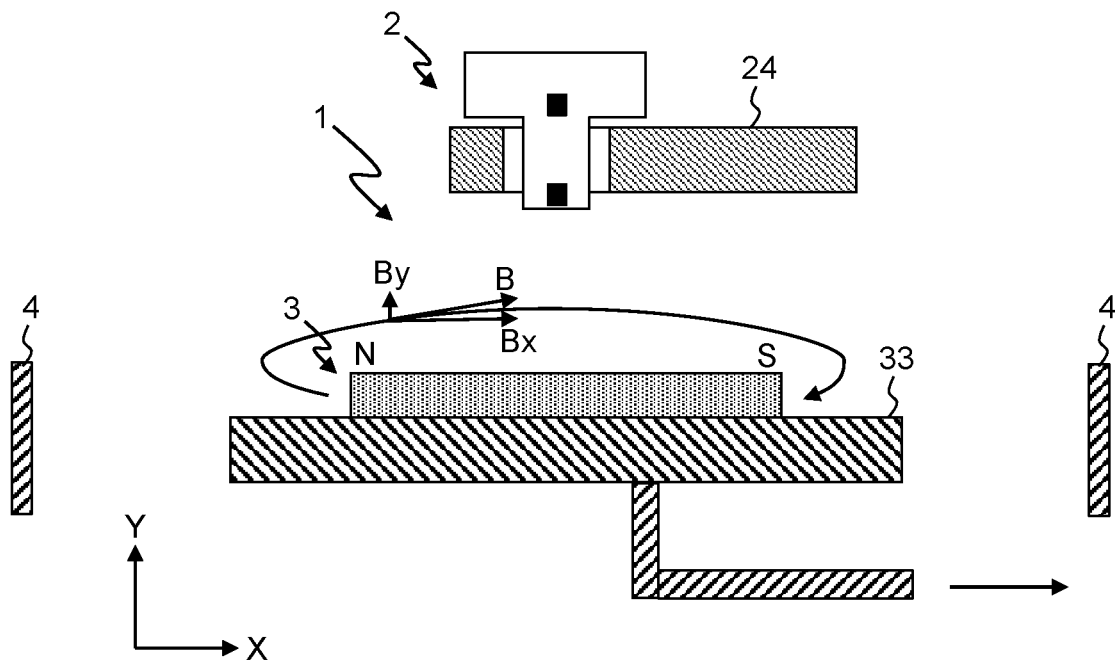
FIG. 6 is a schematic view showing the arrangement of a stroke sensor according to a modification.

As shown in FIG. 6, first magnet 3 may be a single magnet. The intensity of magnetic flux By in the Y direction that is detected by magnetic field detecting element 21 changes depending on the relative position of first magnet 3. Accordingly, the intensity of magnetic flux By can be used as an indicator value of the relative position of first magnet 3. In other words, in this modification, indicator value S is an output voltage that is determined based on the intensity of a magnetic field.

Figure 7:
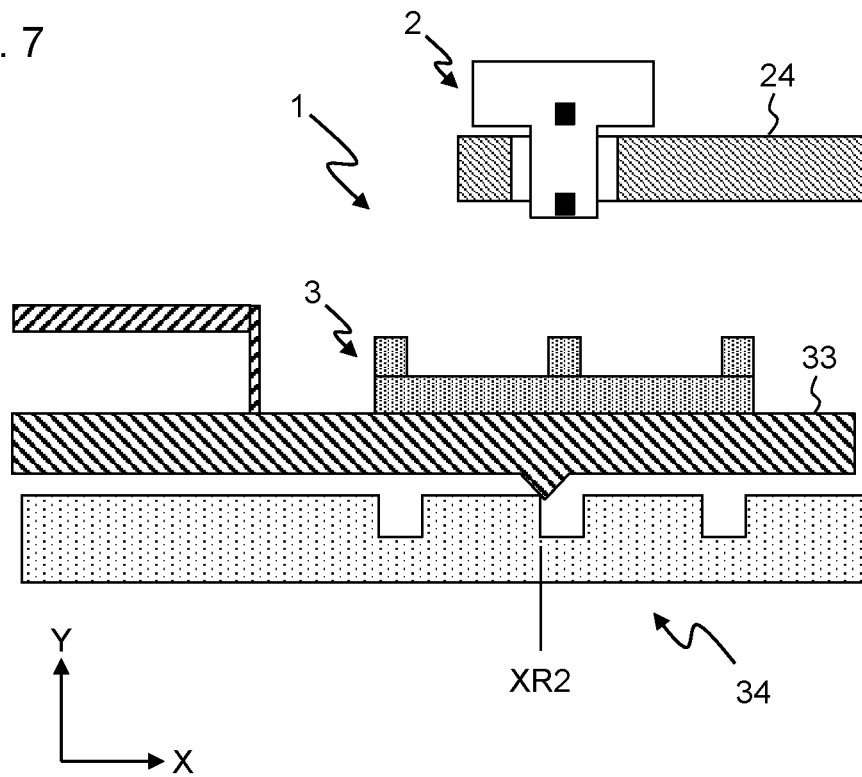
FIG. 7 is a schematic view showing the arrangement of a stroke sensor according to another modification.

As shown in FIG. 7, if first magnet 3 can be stopped at intermediate positions of the movable range by latch mechanism 34 or the like, then the intermediate positions where first magnet 3 can be stopped may be used as first reference position XR1 and second reference position XR. In other words, physically determinable first reference position XR1 and second reference position XR2 are not limited to both ends of the movable range.

In addition, the calibration may be omitted. As shown in FIG. 2A, it is preferable for the output characteristics of stroke sensor 1 to linearize the relationship between the relative position and the output voltage by the calibration, but linearization is not essential. Omitting the calibration leads to simplification of the production process.

Although a certain preferred embodiment of the present invention has been shown and described in detail, it should be understood that various changes and modifications may be made without departing from the spirit or scope of the appended claims.

What is claimed is:

1. A method of installing a stroke sensor, wherein the stroke sensor includes
    a magnetic field detecting element that detects a magnetic field,
    a first magnet that generates the magnetic field and that is movable in a first direction relative to the magnetic field detecting element, and
    a processor that calculates an indicator value S based on the magnetic field that is detected by the magnetic field detecting element,
    wherein the indicator value S indicates a relative position of the first magnet relative to the magnetic field detecting element,
    the method comprising the steps of:
    arranging a second magnet, relative to the magnetic field detecting element, at a physically determinable first reference position and obtaining an indicator value S1;
    attaching the first magnet and the magnetic field detecting element to structures different from each other, respectively, and positioning the first magnet, relative to the magnetic field detecting element, at a physically determinable second reference position, and obtaining an indicator value S2, wherein the second reference position corresponds to the first reference position;
    calculating ΔS, wherein ΔS is an amendment value based on a difference between the indicator value S1 and the indicator value S2; and
    modifying a process in the processor such that the indicator value S is amended using the ΔS and is outputted.

2. The method according to claim 1, wherein the second reference position is at an end of a movable range of the first magnet, and the first reference position is at a corresponding end of a movable range that simulates the movable range.

3. The method according to claim 1, wherein a relationship between the relative position and the indicator value S is expressed by a linear function.

4. The method according to claim 3, further comprising the steps of:

obtaining a relationship between relative positions of the second magnet and initial indicator values while moving the second magnet in the first direction relative to the magnetic field detecting element, wherein the relative positions are obtained relative to the magnetic field detecting element, and the initial indicator values indicate the respective relative positions;

obtaining converting means that converts the relationship to the linear function; and writing the converting means in the processor.

5. The method according to claim 4, wherein the second magnet is a master magnet.

6. The method according to claim 4, wherein the second magnet is same as the first magnet.

7. The method according to claim 1, wherein the indicator value S is an output voltage of the stroke sensor, wherein the output voltage is based on an angle of the magnetic field, the angle being obtained from the magnetic field that is detected by the magnetic field detecting element.

8. The method according to claim 1, wherein the indicator value S is an output voltage of the stroke sensor, wherein the output voltage is based on intensity of the magnetic field, the intensity being obtained from the magnetic field that is detected by the magnetic field detecting element.

9. The method according to claim 1, wherein the second reference position is an initial position where the first magnet is attached to the structure.

10. A method of producing a brake system, wherein the brake system includes:

a magnetic field detecting element that detects a magnetic field, a first magnet connected to a brake pedal that generates the magnetic field and that is movable in a first direction relative to the magnetic field detecting element, and a processor that calculates an indicator value S based on the magnetic field that is detected by the magnetic field detecting element, wherein the indicator value S indicates a relative position of the first magnet relative to the magnetic field detecting element, the method comprising the steps of:

arranging a second magnet, relative to the magnetic field detecting element, at a physically determinable first reference position and obtaining an indicator value S1;

attaching the first magnet and the magnetic field detecting element to structures different from each other, respectively, and positioning the first magnet, relative to the magnetic field detecting element, at a physically determinable second reference position, and obtaining an indicator value S2, wherein the second reference position corresponds to the first reference position;

calculating $\Delta S$, wherein $\Delta S$ is an amendment value based on a difference between the indicator value S1 and the indicator value S2; and modifying a process in the processor such that the indicator value S is amended using the $\Delta S$ and is outputted.

* * * * *